US00RE37855E

(19) United States
(12) Reissued Patent
Becht

(10) Patent Number: US RE37,855 E
(45) Date of Reissued Patent: Sep. 24, 2002

(54) PREPARING A BOAT FOR USE

(76) Inventor: John J. Becht, P.O. Box 441, Southold, NY (US) 11971

(21) Appl. No.: 09/585,787

(22) Filed: Jun. 5, 2000

Related U.S. Patent Documents

Reissue of:
(64) Patent No.: 5,779,250
Issued: Jul. 14, 1998
Appl. No.: 08/751,973
Filed: Nov. 19, 1996

(51) Int. Cl.[7] ..... B60P 3/10; B62B 11/00; B60R 27/00

(52) U.S. Cl. ..... 280/414.2; 280/47.331; 280/767

(58) Field of Search ..... 280/47.331, 414.1, 280/414.2, 645, 42, DIG. 6, 767; 301/111, 113, 121, 122, 125

(56) References Cited

U.S. PATENT DOCUMENTS 2,540,279 A * 2/1951 Mosier ..... 280/414.2
2,624,591 A * 1/1953 Chopin ..... 280/47.331
3,093,386 A * 6/1963 Case ..... 280/47.331
3,831,211 A * 8/1974 Bustamante ..... 9/1 T
4,300,252 A * 11/1981 Montooth ..... 280/414.2
4,318,196 A * 3/1982 Eide ..... 114/344
4,392,665 A * 7/1983 Miller et al. ..... 280/414.2
4,522,420 A * 6/1985 Hannappel ..... 280/289 A
4,615,534 A * 10/1986 Blain ..... 280/47.13 B
4,706,983 A * 11/1987 Griswold ..... 280/414.2

* cited by examiner

*Primary Examiner*—Brian L. Johnson
*Assistant Examiner*—Bridget Avery
(74) *Attorney, Agent, or Firm*—Myron Amer P.C.

(57) ABSTRACT

A method of preparing a lightweight boat for use by using to advantage the overhang of the boat transom beyond the tailgate of the transporting van to provide a working clearance to attach wheel means thereto, and the floating depth beneath the launched boat to provide a working clearance to unattach the wheel means. While the wheel means are attached, the boat is transported like a wheel barrow a walking distance from a parking lot to a lake or the like.

1 Claim, 3 Drawing Sheets

PREPARING A BOAT FOR USE

Matter enclosed in heavy brackets [ ] appears in the original patent but forms no part of this reissue specification; matter printed in italics indicates the additions made by reissue.

The present invention relates generally to facilitating the preparation of a lightweight boat for use, and more particularly to the attaching, and detaching of wheel means to the boat with minimal effort in which, more particularly, the vehicle used to transport the boat to a site of use contributes to the minimal effort in the attachment and detachment of the wheel means.

EXAMPLES OF THE PRIOR ART

The off loading of a skiff or lightweight boat from the roof top or interior of a van, the vehicle of choice for this transporting chore, typically further requires movement of the boat, which typically is 300 pounds, from a parking lot or like area adjacent a lake or similar body of water, into which it is desired to place the boat preparatory to the use thereof. The referred to further movement, although usually within a walking distance, is understandably greatly facilitated by a temporary attachment of wheel means to the boat transom and wheeling the boat, much like a wheel barrow, to the lake for launching. Exemplary wheel means already known used for the purposes noted are described and illustrated in U.S. Pat. No. 4,588,203 for "Retractable Wheel Strut Assembly" issued to Milan B. Anderson on May 13, 1986, U.S. Pat. No. 4,127,281 for "Boat Roller" issued to Roy A. Ferguson on Nov. 28, 1978 and U.S. Pat. No. 3,831,211 for "Lightweight Boat Moving Device" issued to Sebastian R. Bustamente on Aug. 27, 1974. While in the referenced and all other known prior patents describing and illustrating wheel means for the walking distance "transport of boats, the proposed wheel means achieves moving the boat like a wheel barrow, the attachment and detachment of the wheels is somewhat complicated, in that it requires at the least supporting the boat transom in a raised condition during wheel means attachment, and a difficult detaching procedure after the boat is launched when, of course, the wheel means if not removed would adversely effect the performance of the boat.

Broadly, it is an object of the present invention to prepare a lightweight boat for boating service overcoming the foregoing and other shortcomings of the prior art.

More specifically, it is an object to provide wheel means that are readily attachable to and detachable from the boat transom using to advantage the transporting of the boat on a vehicle providing a working clearance or open space below the boat transom, in which open space the wheel means is properly positioned to be attached to the boat transom, and thus obviating the need to lift the boat transom to obtain this open space for the wheel means attaching procedure, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

The drawings illustrate a known lightweight boat 10 of a type typically maintained at a site of storage, such as the user's garage, and transported to a site of use, such as a parking lot or like area within walking distance to a lake or other similar body of water in which the boat 10 is desired to be placed preparatory to use. The transport of choice from one site to the other is a van 12, the boat being located in its interior 14 or, alternatively on the van roof 16, but in either case placed, at the site of use, in the condition illustrated in FIG. 1.

Figure 1:
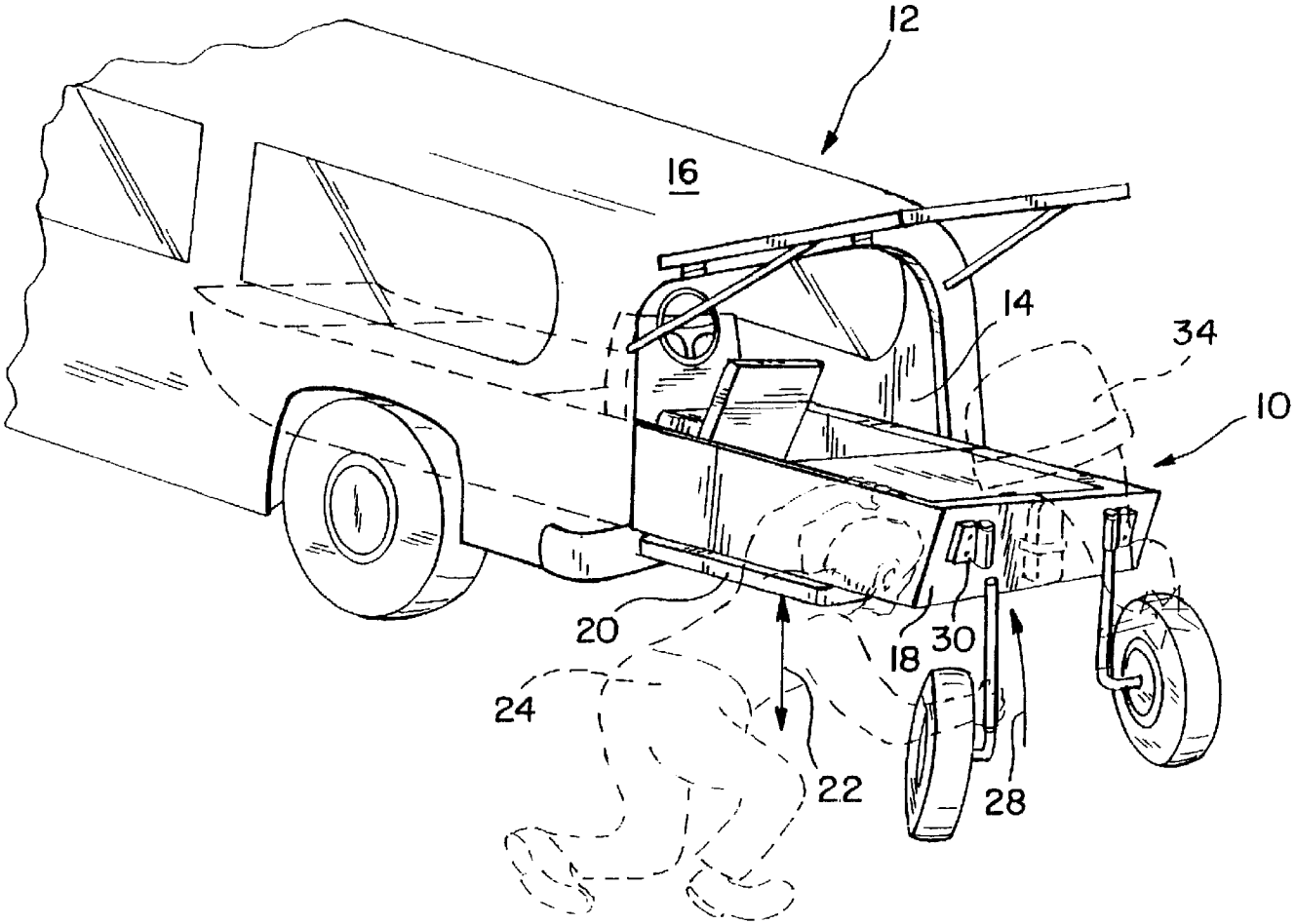
FIG. 1 is a perspective view of a van-transported boat illustrating preliminary preparation of the use of the boat according to the within inventive method.
Figure 2:
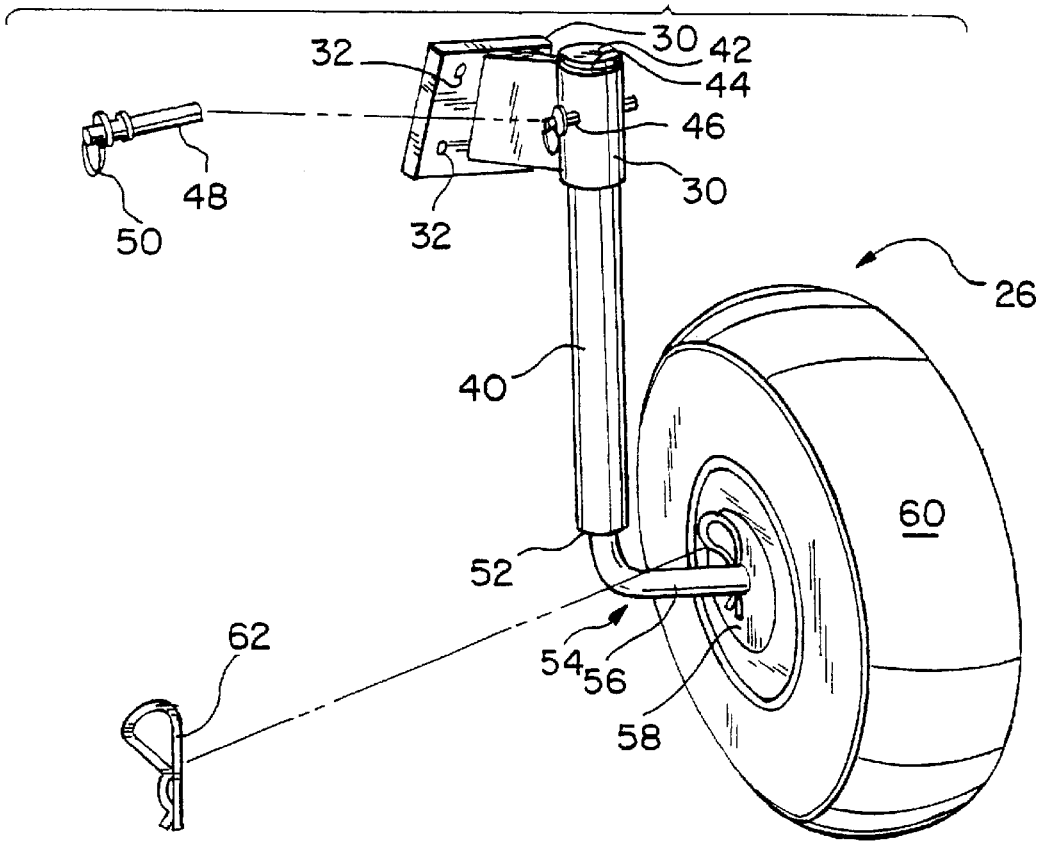
FIG. 2 is an exploded view of the wheel means selected to facilitate the boat-preparation method.

The FIG. 1 boat condition contributes to the boat-preparation method hereof in that the boat transom 18 overhangs the van tailgate 20 and provides a working clearance 22 beneath the transom 18 in which the user 24 can readily insert a pair of left and right identical wheel means, generally designated 26 in FIG. 2, which wheel means 26 is selected to be attached, for the temporary purposes intended, in an upward or ascending movement 28 provided by the working clearance 22 into a cooperating left and right cylindrical bracket 30, each appropriately bolted, as at 32, to the transom 18 on opposite sides of the boat outboard motor 34, which motor is attached in a known manner at any appropriate time during the preparation of the boat as the option of the user 24.

Figure 3:
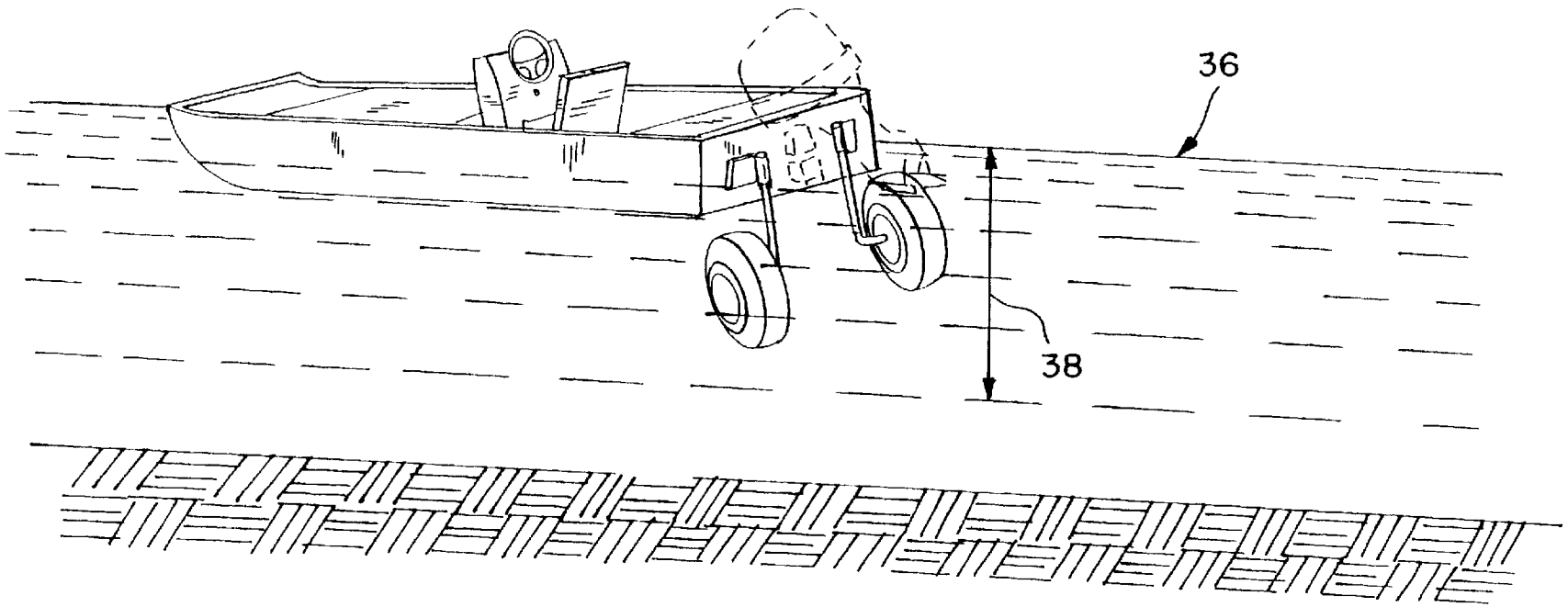
FIG. 3 is a view similar in perspective to FIG. 1 and illustrating the boat in a completed condition for use.

As shown in FIG. 3, the boat 10 with attached wheel means 26, which will be understood to have permitted the boat to be wheeled, much like a wheel barrow, from a lake-adjacent area to the lake 36 and placed in the boat-floating condition illustrated in FIG. 3. The FIG. 3 boat condition like that of FIG. 1 also contributes to the boat preparation method hereof in that the boat 10 floats at a depth 38 selected to provide working clearance beneath the transom 18 to permit the user to reach rearwardly over the transom 18 and unattach the wheel means 26 in a descending movement, duplicating but in reverse, the attaching movement 28.

Shown in FIG. 2, to which reference should now be made, is a preferred embodiment of the identical left and right wheel means 26 selected to facilitate the boat-preparation method hereof in that attachment and detachment thereof in the working clearances of FIGS. 1 and 2 is readily achieved. To this end, each wheel means 26 consists of a rod 40 having an upper end 42 sized and shaped to be received in projected relation within a rod-receiving opening 44 of a cooperating cylindrical bracket 30 bolted on the transom 18. The inserted rod upper end 42 and bracket 30 will be understood to have aligned bores 46 through which a pin 48 with a finger grip 50 is inserted to hold the wheel means 26 in attached relation to the transom 18 and conveniently gripped by the grip 50 withdrawn in the detaching of wheel means 26 after the boat 10 is launched as shown in FIG. 3.

Rod 40 at its bottom end 52 is, in an appropriate manner, provided with a swivel extension 54 having a horizontally oriented axle 56 that is sized to be projected through a hub 58 of a wheel 60 of the wheel means 26 and pinned on an outboard side (not shown in FIG. 2), the wheel being held in place so as to be journalled for rotation on the axle 56 between an inboard pin 62 and the referred to outboard pin. For convenient storage, the wheels 60 can be detached by removal of the pins 62.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

[1. Improvements in a method of preparing a boat for boating service, said boat being of a type having a rear transom and characterized by a nominal weight contributing to the transport of said boat from a site of storage to a site of use adjacent a body of water into which said boat provides said boating service, said method comprising the steps of attaching to aid transom in spaced-apart relation a pair of cylindrical connecting members bounding a circular rod-receiving opening and each having opposite pin-receiving openings in horizontal alignment with each other, constructing for transport with said boat pair of wheel means each comprises of a rod of a selected vertical size when used in a vertical orientation having a horizontally oriented axle attached to the bottom end of said rod and having journalled for rotation on said axle a wheel, said axle being projected through a hub of said wheel and pinned using an inboard pin means to hold said wheel in place, and having a pin-receiving through bore adjacent an upper end of said rod, transporting in a condition supported from below said boat on a vehicle form said site of storage to said site of use, moving said boat transom in an overhang relation to said vehicle to establish beneath said transom-attached cylindrical connecting members a working clearance exceeding that of said vertical size of said rod of said wheel means, moving said rods in said working clearance so as to cause an interengagement of said rod upper ends within said cylindrical connecting members and an alignment of said pin-receiving respective connecting members openings and upper end rod through bore, attaching said wheel means to said overhanging boat transom using outboard pin means seated in said pin-receiving respective connecting members openings and upper end rod through bore, transporting manually said boat of said attached wheel means into said adjacent body of water to a level exceeding said vertical size of said rod wheel means, and detaching said wheel means from said body by withdrawing said pin mean and urging said rods in descending movement clear of said cylindrical connecting members, whereby there is minimal effort required of the user in providing working clearance in the attaching and detaching of said wheel means incident to the placement of said boat in boat service-rendering condition.]

*2. Improvements in a method of preparing a boat for boating service, said boat being of a type having a bow and a stern and characterized by a nominal weight contributing to the transport of said boat from a site of storage to a site of use adjacent a body of water into which said boat provides said boating service, said method comprising the steps of attaching to said stern in spaced-apart relation a pair of cylindrical connecting members bounding a circular rod-receiving opening and each having opposite pin-receiving openings in horizontal alignment with each other, constructing for transport with said boat a pair of wheel means each comprised of a rod of a selected vertical size when used in a vertical orientation having a horizontally oriented axle attached to the bottom end of said rod and having journalled for rotation on said axle a wheel, said axle being projected through a hub of said wheel and pinned using an inboard pin means to hold said wheel in place and having a pin-receiving through bore adjacent an upper end of said rod, transporting in a condition supported from below said boat on a vehicle from said site of storage to said site of use, moving said boat stern in an overhanging relation to said vehicle to establish beneath said stern-attached cylindrical connecting members a working clearance exceeding that of said vertical size of said rod of said wheel means, moving said rods in said working clearance so as to cause an interengagement of said rod upper ends within said cylindrical connecting members and an alignment of said pin-receiving respective connecting members openings and upper end rod through bore, attaching said wheel means to said overhanging boat stern using outboard pin means seated in said pin-receiving respective connecting members openings and upper end rod through bore, transporting manually said boat with said attached wheel means into said adjacent body of water to a level exceeding said vertical size of said rod wheel means, and detaching said wheel means from said boat by withdrawing said pin mean and urging said rods in descending movement clear of said cylindrical connecting members, whereby there is minimal effort required of the user in providing working clearance in the attaching and detaching of said wheel means incident to the placement of said boat in boat service-rendering condition.*

* * * * *